Figures 1, 2:
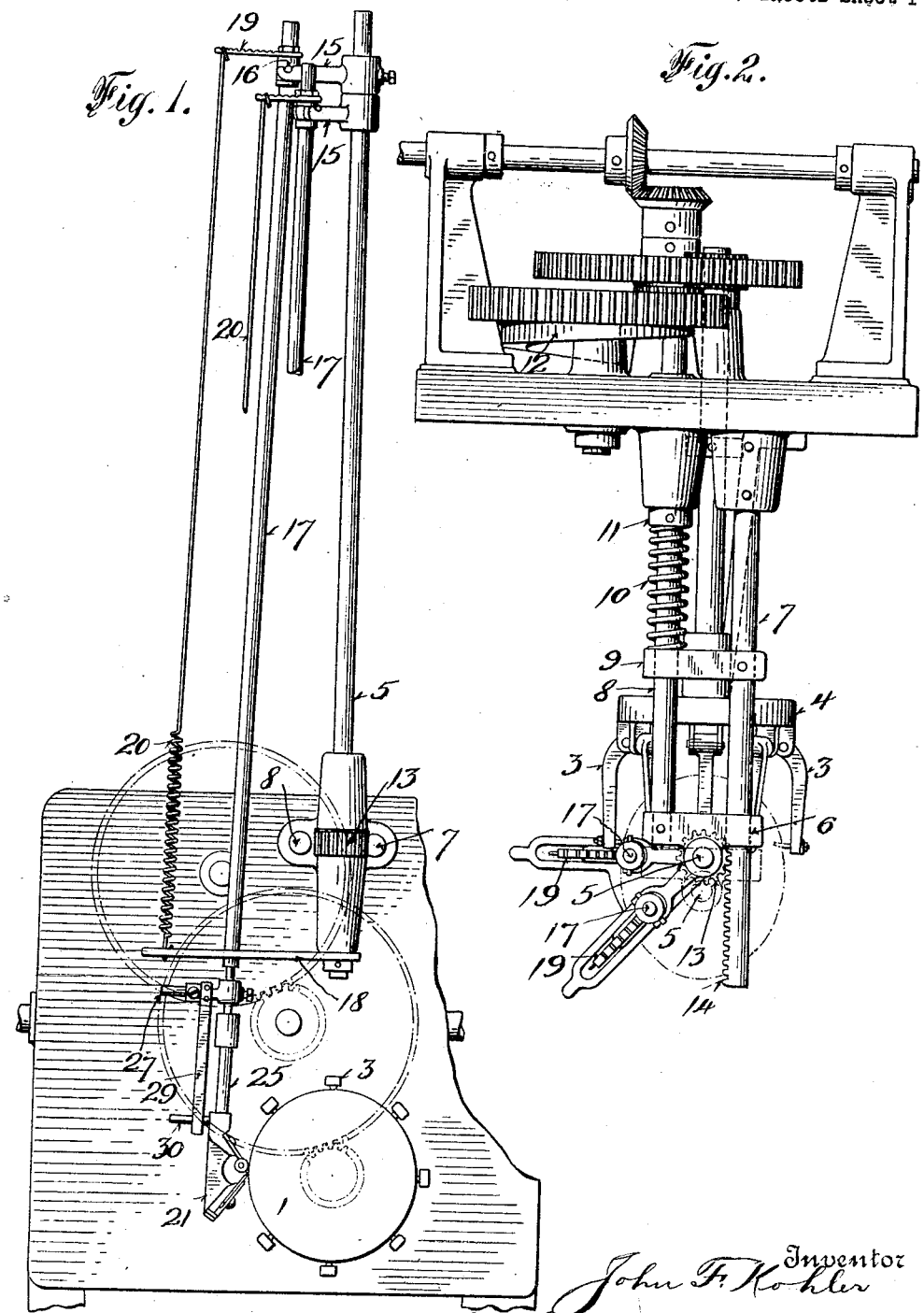

July 7, 1925.

J. F. KOHLER

PARING MACHINE

Filed Aug. 22, 1923

1,545,106

2 Sheets-Sheet 1

Inventor
John F. Kohler
By his Attorney
Charles G. Hensley

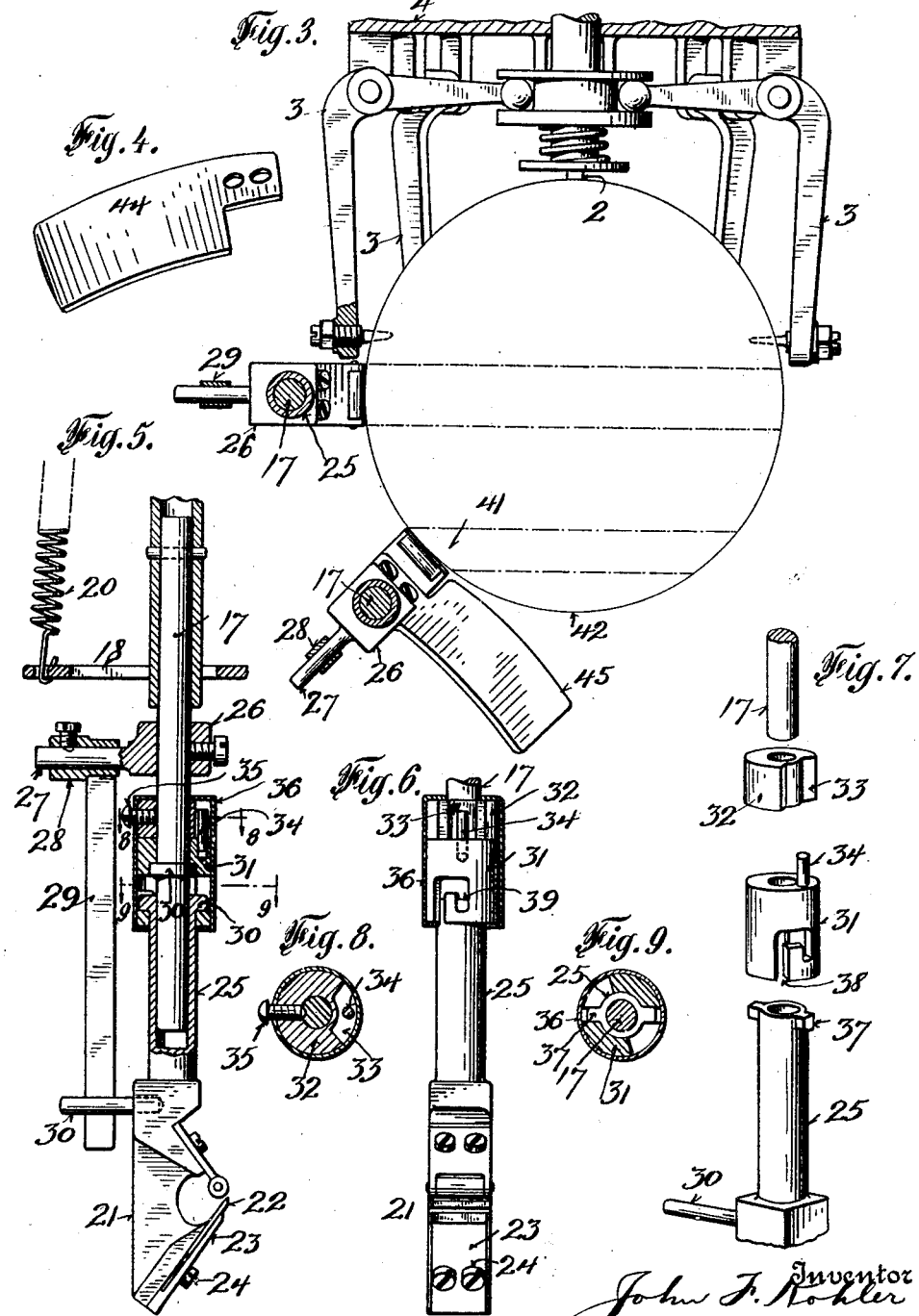

Patented July 7, 1925.

1,545,106

UNITED STATES PATENT OFFICE.

JOHN F. KOHLER, OF LARCHMONT MANOR, NEW YORK.

PARING MACHINE.

Application filed August 22, 1923. Serial No. 658,704.

*To all whom it may concern:*

Be it known that I, JOHN F. KOHLER, a citizen of the United States, and a resident of Larchmont Manor, in the county of Westchester and State of New York, have invented certain new and useful Improvements in Paring Machines, of which the following is a specification.

My invention relates to a machine for paring edible products and I have chosen to illustrate and describe the same as embodied in a machine for paring cocoanuts intending, however, to protect the invention in all its uses.

In U. S. Letters Patent issued to me on February 13, 1923, and numbered 1,445,144, 1,445,145, 1,445,146, 1,445,147, respectively, I have shown machines or parts of machines for paring cocoanuts; i. e., for paring the thin brown skin from the cocoanut mechanically and in such a way that the waste is reduced to a minimum and so that the nuts may be pared very rapidly. In at least one of those patents I showed two paring knives, one of which served to pare from the equatorial line of the cocoanut to one of its poles and the other knife of which pared from the equatorial line to the opposite pole of the nut. That arrangement operated satisfactorily and it is embodied in the present machine but I found that the speed of operation of the machine could be increased by employing the knife arrangement shown herein.

Cocoanuts are of many different shapes and sizes, some having almost flat faces, others being round and others oval, and where the paring knife is present against the cocoanut by resistable pressure, as by the action of a spring, in order to keep it in paring contact with the nut and to allow the knife to follow the irregularities of contour of the nut, the knife has a tendency to jump away from the nut momentarily if the latter is revolved at high speed, thereby leaving patches of unpared portions on the nut. If the spring pressure were increased to a point where this could not occur even at high speed the pressure would be too great for the nut to resist and this would cause it to break. In the present machine I have provided a plurality of knives for paring the same half of the nut and these operate simultaneously, each paring different portions of the nut between the equatorial line and one of its poles. In the fullest embodiment of my invention the construction is duplicated so that there are a plurality of paring knives for each half of the nut.

Considering the knives which operate on one half of the nut it will be apparent that if these operate simultaneously and if each is set to pare a different portion of one half the nut, then if the nut is revolved at the same speed as that employed in my former machine, the half of the nut may be pared in one half the time, if two knives are used. Or, conversely, the nut may be revolved at half the speed and the output will be equal to that of the prior machines. As the work is divided between the several knives they can pare the nuts rapidly, efficiently, and at high speed.

In the drawings forming part of this application,

Figure 1 is an elevation of a part of a paring machine embodying my improvements, Figure 2 is a plan view thereof, Figure 3 is an enlarged detailed view showing the nut holding devices and the paring knives, Figure 4 is a detailed view of a guard member, Figure 5 is an elevation partly in section of one of the paring knives and its holder, Figure 6 is a similar view taken at right angles to Figure 5, Figure 7 is a view showing the method of assembling the knife supporting members, Figure 8 is a sectional view taken on the line 8—8 of Figure 5, and Figure 9 is a sectional view taken on the line 9—9 of Figure 5.

While my invention is not limited in its application to one form of machine, I have chosen to illustrate it as adapted for and embodied in a machine like the one shown in my U. S. Patent No. 1,445,144. It may be stated that the entire machine shown in said patent may be employed in connection with the present improvements except that in the present case the plurality of paring knives for paring one half of the cocoanut are substituted in place of the single knife for that purpose shown in the said patent. To some extent the paring knives in the present case resemble those of the said patent. In Figure 3 I have shown a cocoanut 1 having one of its poles resting against the chuck member 2 and the gripper levers 3 arranged in circular form, the same as in the said patent, all engage with their free ends around the cocoanut a short distance away from its equatorial line whereby a little more than one half of the cocoanut is exposed to the action of the paring knives. It will be understood that the carrier 4 on which the gripper levers 3 are mounted is revolted during the paring operation, the same as in my said patent, and as the entire gripping device shown in the said patent may be incorporated bodily into this machine it is deemed unnecessary to illustrate that device in full here.

In my said patent, I provided one paring knife for paring one half of a cocoanut and this knife moved from the equatorial line of the cocoanut to one of its poles and therefore the same knife pared one half of the nut. In the present case I employ a plurality of knives, preferably two, and these are so arranged that they pare different portions of the same half of the nut so that each knife really traverses approximately one quarter of the nut. Both paring knives are mounted on similar levers and they are provided with the same attaching means so that a description of one of these will answer for both. For the paring knife there is a rod 5 pivoted to revolve in a bearing block 6 which is slidable along the rack bar 7 which serves as a guide. The block 6 is fixed to one end of a sliding rod 8 which is guided in a bearing member 9 which is fixed to the guide rod 7. There is a compression spring 10 arranged between the block 9 and a collar 11 fixed to the rod 8 the action of the spring 10 causing the rod 8 to move toward the top of the sheet in Figure 2. The sliding rod 8 is operated in the opposite direction by a cam 12 which corresponds to and performs the same function as the cam in my said patent; that is, it moves the rod 8 toward the bottom of the sheet in Figure 2. This cam is preferably operated through a series of gears, the same as the cam in said patent. The rod 5 which is pivoted in the movable bearing block 6 has a pinion 13 which meshes with the rack teeth 14 on the fixed rod, 7. From this, it will be apparent that as the block 6 slides along the rod 7 the pinion 13 and the rod 5 which carries it will be rotated back and forth. In the present case the bearing block 6 has a shorter movement than the corresponding bearing block in the said patent because in the present case one paring knife moves only half the distance from the equatorial line of the nut to one of its poles. This is provided for by making the rise of the cam 12 approximately one half the rise of the corresponding cam in said patent. The rod 5 has an upper fork 15 which receives and holds the pins 16 which form a pivotal bearing for the swinging arm 17 the same as in the said patent. The lower end of the swinging arm 17 is guided in a yoke 18 which is secured to the lower end of the rod 5 which also corresponds to the construction in said patent. The upper end of the arm 17 has a projection 19 to which one end of a spring 20 is connected, the other end of this spring being secured to the outer end of the yoke 18. As the spring 20 pulls down on the extension 19 it tends to swing the lower end of the arm 17 to the right in Figure 1 or, in other words, it presses the paring knife against the cocoanut and causes it to follow the contour of the nut whatever its shape may be. The knife holder in the present case is a modification of the one shown in my said patent and it is made to provide for a quick detachment of the paring knife holder in order to permit the blade of the knife to be removed and replaced by a sharp blade in the shortest possible time. The knife holding member 21 to which the blade 22 is secured by a clamping plate 23 held by the screw 24 to the holder, is mounted on a sleeve 25 which slides over the lower end of the rod 17. Above the knife holder there is a collar 26 and it has a projecting pin 27 to which is secured a member 28 which has a pair of depending plate springs 29 the lower free ends of which engage on opposite sides of the pin 30 which projects from the back of the knife holder 21. These springs permit the knife holder to revolve right or left in order to permit the knife to adjust itself automatically to the contour of the nut and the springs 29 serve to return the knife holder to the normal or intermediate position when released from the nut. The knife holder is held on the rod 17 by a bayonet connection in the following manner:

The rod 17 has a flange 30 on which the shoulder of a sleeve 31 rests. There is a block 32 which rests upon the sleeve 31. The sleeve 31 has a pin 34 projecting at the top which moves in a segmental recess 33 in the block 32 which is secured to the rod 17 above the sleeve, by means of the set screw 35. These parts are preferably inclosed in a casing 36 to protect the parts from dirt and parings. The sleeve 25 on the knife holder is provided with pins 37 to engage in the bayonet slot 38 in the sleeve 31. The parts are shown assembled ready for operation in Figure 5. Whenever it is desired to remove the knife holder in order to replace the blade, it is only necessary to push upwardly on the knife holder 21 until the pins 37 rise out of the portion 39 of the bayonet slot and then the knife holder is turned to the left, bringing the pins 37 in line with the portion 38 of the slot and when this occurs the knife holder is moved downwardly off the end of the rod 17 and a new blade may be placed in the holder or a substitute holder with a new blade may be slipped into place. To return the knife holder the above operations are simply reversed. This means of attaching the knife holder to its swinging arm is preferably duplicated for the second knife.

The second knife is mounted on an arm 17 which is pivotally supported on the movable rod 5. The parts previously described in connection with the first knife are duplicated, that is to say, members 5, 15, 16, 17, 18, 19, 20, 21, to 36 are provided for this second knife and there is a duplicate cam 12 for moving a second sliding rod 8. The movable bearing block 6 for the second knife reciprocates like the first one, a distance substantially equal to one quarter the average length of a cocoanut. In Figure 2 I have shown the paring devices in the starting position, that is to say, in the position which exists at the moment the knives commence to operate upon the nut. The parts bearing the knives remain in this position while the nut is revolved with the holder one complete revolution, whereby a paring is made completely around the nut by each knife before the knives began to traverse. It will be noted that the first knife 22 is at the equatorial line of the nut whereas the knife 40 is at a point intermediate the equatorial line and one pole of the nut. After the first revolution of the nut the cams 12 commence to move the rods 8 and the bearing blocks 6 downwardly in Figure 2 and this advances the axes of the rods 5 toward the pole of the nut. This movement causes the pinions 13 to be revolved by the stationary rack teeth 14 so that the rods 5 are rotated slightly while they are also reciprocated parallel with the axis of the nut. During this traversing movement of the knives the latter are pressed continually against the nut by the springs 20. The knife 22 will traverse from the equatorial line of the nut to the line 41 in Figure 3, which is the position at which the second knife 40 began to operate. The second knife, 40, on the other hand, began to operate or pare, at the line 41 and while the first knife is approaching this position the second knife is moving to the pole 42 of the nut. Thus it will be apparent that the two knives acting simultaneously but on different portions of the same half of the nut, pare the respective portions and the operation ceases when the knife 22 has reached the pole 42 of the nut. At any given speed of revolution of the nut, the two knives in their joint action can pare one half the nut in one half the time that one knife could pare the same half. Therefore, the machine may be operated at a speed which will give maximum production. It will be understood that after the first half of the nut has been pared the nut may be transferred from the gripping device shown herein to another gripping device ready for paring on the unpared half of the nut. This simply requires the transferring mechanism shown in my said patent together with a duplicate set of paring knives like the ones shown herein.

I have found that the knife which pares nearest the pole of the nut has its edge exposed at such an angle relative to the surface of the nut that the knife tends to turn in so that one corner wedges against the nut. To prevent this, I have shown a plate 44 secured to the holder 21 of the second knife. The edge 45 of this guard is adapted to come into contact with the nut in the event that the knife holder is turned too far by the action above described, and this guard will prevent the corner of the knife wedging in the nut. While a guard of this kind may be employed for the first knife, I have found that it is hardly necessary there because there is little tendency for the knife holder in this case to turn too far. In the present case, as in my said patent, the knives are held in their normal or intermediate positions by means of the springs 29 but when the knives are pressed against the cocoanut, the holders may be turned right or left by the nut so that the knife at all times is free to follow the contour of the nut. Except for the differences in the paring knives herein described, the machine as a whole may be constructed exactly like that of my said patent.

Having described my invention, what I claim is,

1. In a paring machine the combination of means for holding a nut with one half thereof exposed to the action of the paring knives and means for paring the nut, comprising a plurality of knives and means to cause them to operate on the same half of the nut between its equatorial line and one of its poles.

2. In a paring machine the combination of means for holding a nut with one half thereof exposed to the action of the paring knives, and means for paring the nut, comprising a plurality of knives and means for causing them to operate on different sections of the same half of the nut between its equatorial line and one of its poles.

3. In a paring machine the combination of means for holding a nut with one half thereof exposed to the action of the paring knives, and means for paring the nut, including a plurality of knives and means for causing them to operate simultaneously on different sections of the same half of the nut between its equatorial line and one of its poles.

4. In a paring machine the combination of means for holding and revolving a nut with one half thereof exposed to the action of the paring knives, and means for paring the nut, including a plurality of knives and means for causing them to simultaneously pare different sections of the same half of the nut between its equatorial line and one of its poles.

5. In a paring machine the combination of means for holding and revolving a nut with one half thereof exposed to the action of the paring knives, and means for paring the nut, including a plurality of knives, means for operating one of said knives to cause it to pare the nut from its equatorial line to a line between said equatorial line and one of the poles of the nut, and means for operating another of said knives whereby it will pare from the line where said first knife terminates its operations, to said pole of the nut.

6. In a paring machine the combination of means for holding a nut with one half thereof exposed to the action of the paring knives, and means for paring the nut, including a plurality of knives, means for operating one of said knives to cause it to pare the nut from its equatorial line to a line between said equatorial line and one of the poles of the nut, and means for operating another of said knives whereby it will pare from the line where said first knife terminates its operations, to said pole of the nut, said knives performing their paring operations simultaneously.

7. In a paring machine the combination of means for holding a nut with one half thereof exposed to the action of the paring knives, and means for paring the nut, including a plurality of knives, means for resistibly pressing each knife toward the nut, and means for operating said knives whereby they simultaneously pare different sections of the nut between the equatorial line thereof and one of its poles.

8. In a paring machine means for holding a nut to be pared, and means for paring the nut comprising a swiveling knife holder, a paring knife in said holder, a guard for said knife to control the depth of cut, and a guard projecting laterally near said knife and adapted to contact with the nut to prevent excessive turning of the knife in relation to the nut.

9. In the paring machines having means for holding a nut to be pared, a knife carrying arm, a swiveling knife holder, means for resiliently resisting the turning of said knife holder on said arm, a sleeve fixed on said arm, and having a bayonet slot, a pin on said knife holder for engaging in said bayonet slot to hold the knife holder on said arm, and means for limiting the angle of turning of said knife holder on said arm.

Signed at the city, county and State of New York, this 18th day of July, 1923.

JOHN F. KOHLER.